US008340433B2

United States Patent
Suzuki

(10) Patent No.: US 8,340,433 B2
(45) Date of Patent: Dec. 25, 2012

(54) IMAGE PROCESSING APPARATUS, ELECTRONIC MEDIUM, AND IMAGE PROCESSING METHOD

(75) Inventor: Tomohisa Suzuki, Yokohama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 789 days.

(21) Appl. No.: 12/549,827

(22) Filed: Aug. 28, 2009

(65) Prior Publication Data
US 2010/0104194 A1    Apr. 29, 2010

(30) Foreign Application Priority Data

Oct. 29, 2008  (JP) ................................ P2008-277870

(51) Int. Cl.
*G06K 9/46*     (2006.01)

(52) U.S. Cl. ......... 382/195; 382/112; 382/289; 382/296
(58) Field of Classification Search .................. 382/112, 382/151, 195, 199, 201, 202, 216, 289, 296
See application file for complete search history.

(56) References Cited

U.S. PATENT DOCUMENTS
2006/0193518 A1*   8/2006   Dong ........................... 382/186

FOREIGN PATENT DOCUMENTS
JP          57-52971         3/1982

* cited by examiner

*Primary Examiner* — Claire X Wang
*Assistant Examiner* — Michael Vanchy, Jr.
(74) *Attorney, Agent, or Firm* — Finnegan, Henderson, Farabow, Garrett & Dunner, L.L.P.

(57) ABSTRACT

An image processing apparatus include: a storage unit storing an image of a processing target; a tangent calculating unit extracting contours as a bent lines represented by sets of contour points from an image read from the storage unit and computing tangents to the extracted contour; a projecting unit projecting computed tangents to axes in directions orthogonal to the corresponding tangents, and computing coordinates of intersections where the tangents intersect the axes; and a rectangle calculating unit selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

15 Claims, 11 Drawing Sheets

IMAGE PROCESSING APPARATUS, ELECTRONIC MEDIUM, AND IMAGE PROCESSING METHOD

CROSS-REFERENCE TO RELATED APPLICATIONS

This application is based upon and claims the benefit of priority from the prior Japanese Patent Application No. 2008-277870, filed on Oct. 29, 2008; the entire contents of which are incorporated herein by reference.

BACKGROUND OF THE INVENTION

1. Field of the Invention

The present invention relates to an image processing apparatus, an electronic medium, and an image processing method for computing a minimum bounding rectangles of a figure in a processing target image in each direction for example.

2. Description of the Related Art

In recognition of characters printed on a number tag in images taken by a camera for example, a character line on the number tag is not always aligned in a horizontal direction.

If this happens, the character part of the number tag does not match with dictionary data for character recognition, and thus it is necessary in general to perform processing for cutting out an image of the character part of the number tag and estimating the direction of the characters.

For example, the character line is extracted from the image and the direction in which the length of the line is maximum is assumed to be the estimated direction of the line.

The candidate of the character row in each direction can be estimated using a minimum bounding rectangle in each direction of the character part image.

As a calculating method of a minimum bounding rectangles, the method described below is widely known.

For example, the maximum values and the minimum values of X coordinates and Y coordinates are computed with respect to each of pixels on a figure or points on a contour of a figure, and they are taken as the coordinates of an upper and lower ends and a left and right ends, thereby computing a minimum bounding rectangles of the figure.

Note that a horizontal direction will be described as an X-axis direction, a vertical direction as a Y-axis direction, a coordinate in the X-axis direction as an X coordinate, and a coordinate in the Y-axis direction as a Y coordinate (these expressions will be used hereinafter).

Another widely known method to compute the minimum bounding rectangles is to compute integrals of the target image or binarization result of the target image in the X-axis direction and the Y-axis direction, and to compute the minimum and maximum coordinate on which the integrals is larger than of or equal with a predefined thresholds.

Furthermore, as methods for calculating a minimum bounding rectangle in each direction, there are several variations of the above-described methods.

In the first example of such a method, the coordinates for each pixel on the figure is transformed to the coordinates in the coordinate system of which one of the axis is parallel to the direction of interest, and the minimum bounding rectangle is determined by computing minimum and maximum of the coordinate transformed above. (hereinafter this method will be denoted "method A").

In the second example of such a method, contour points of a figure are extracted, and a minimum bounding rectangle in a direction of interest is computed as the maximum values and the minimum values of coordinates transformed by the transformation described for method A, for each contour point (hereinafter this method will be denoted "method B").

In the third example of such a method, the image to be processed or an image obtained by binarizing the image to be processed is integrated in a direction of interest and in a direction perpendicular to the direction of interest, and the coordinates of an upper and lower ends and a left and right ends are obtained by taking the minimum values and the maximum values of coordinates for which integrated values are equal to or larger than predefined thresholds (hereinafter this method will be denoted "method C").

In the fourth example of such a method, the image is rotated so that a straight line directed in a direction of interest is a horizontal direction or a vertical direction on the image to be processed, and a minimum bounding rectangle is calculated on the rotated image (hereinafter this method will be denoted "method D").

Furthermore, a typical method to calculate the projection of a figure in each direction is to project coordinates of a pixel of interest to a coordinate axis directed in a direction of interest for each pixel on a figure, and to calculate a histogram of the projected coordinates.

As a method to estimate the direction of a character row, a method, with which a projection of the image is calculated in each direction, and the direction in which the calculated projection changes most rapidly is assumed as the direction of the character row, is known (see, for example, JP-A 57-052971 (KOKAI)).

SUMMARY OF THE INVENTION

In any of the aforementioned methods, the computational complexity is proportional to the number of directions. For example, when the method B is used, the number of coordinate conversion is the product of the number of directions and the number of contour points.

As an example, if the calculated minimum bounding rectangle is used for direction estimation of document images, it is necessary to increase the number of directions in which the minimum bounding rectangle is calculated to improve the estimation accuracy, but the computational complexity increases with the number of directions. Therefore, in some cases with limited computational resource, in a real-time system the estimation accuracy was limited according to the computational complexity.

The present invention is made to solve such a problem, and an object thereof is to provide an image processing apparatus, an electronic medium and an image processing method which are capable of suppressing increase of computational complexity accompanying increase of number of directions in computation of minimum bounding rectangles in multiple directions.

An image processing apparatus according to an embodiment of the present invention includes: a storage unit storing an image to be processed; a tangent calculating unit, which extracts contours as bent lines represented by sets of contour points of an image read from the storage unit and calculates a tangents to the extracted contours; a projecting unit, which projects each of tangent calculated by the tangent calculating unit to an axis orthogonal to the tangent, and computes the coordinate of the intersection of the tangent and the axis; and a rectangle calculating unit, which selects intersections with maximum values and minimum values of coordinates computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

An electronic medium according to an embodiment of the present invention is an electronic medium configured to store an image processing program to execute image processes in an image processing apparatus, the image processing program providing functions of the image processing apparatus, the functions includes: reading an image from a storage unit, extracting a contour represented as an set of contour points from the read image, and calculating tangents to the extracted contour; projecting each of calculated tangent to an axis orthogonal to the tangent, and computing the coordinates of the intersection of the tangent and the axis; and selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

An image processing method according to an embodiment of the present invention is an image processing method in an image processing apparatus having a storage unit storing an image of a processing target, and includes: extracting a contour as a bent line represented as an set of contour points from an image read from the storage unit and computing tangents to the extracted contour; projecting each of computed tangent to an axis orthogonal to the tangent, and computing the coordinates of the intersection of the tangent and the axis; and selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

DESCRIPTION OF THE EMBODIMENTS

Hereinafter, embodiments of the present invention will be described based on the drawings.

The embodiments of the present invention will be described with reference to the drawings, but these drawings are provided for illustrative purpose only, and not for limiting the invention in any way.

(First Embodiment)

Figure 1:
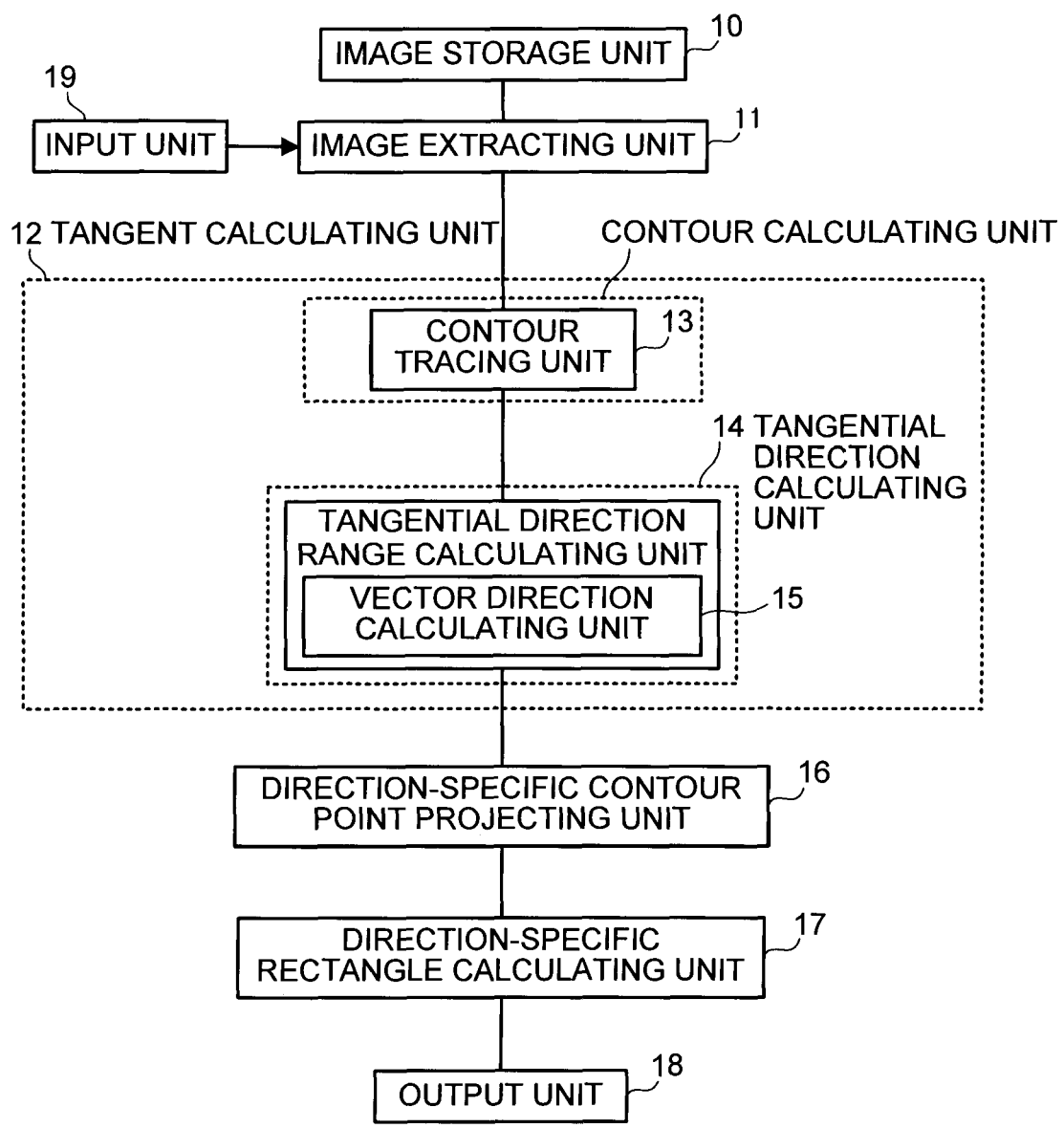
FIG. 1 is a diagram showing the structure of an image processing apparatus according to the first embodiment of the present invention.

FIG. 1 is a block diagram showing the structure of an image processing apparatus according to the first embodiment of the present invention.

As shown in FIG. 1, this image processing apparatus has an image storage unit 10 such as a memory, an image extracting unit 11, a tangent calculating unit 12, a direction-specific contour point projecting unit 16, a direction-specific rectangle calculating unit 17, an output unit 18, an input unit 19, and so on.

The tangent calculating unit 12 has a contour tracing unit 13 of a contour calculating unit, and a tangential direction calculating unit 14, as an example.

The tangential direction calculating unit 14 has a vector direction calculating unit 15 as a tangential direction range calculating unit for limiting a range of directions of tangents used for calculation.

The image storage unit 10 stores an image 201.

Figure 2:
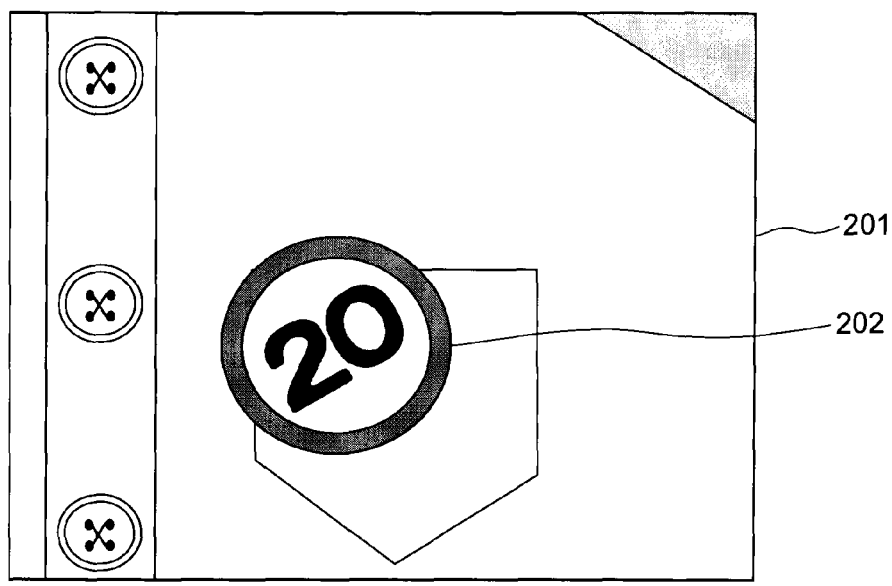
FIG. 2 is a diagram showing an example of an image of a processing target.

As an example of the image stored in the image storage unit 10, a number tag taken by a camera is shown in FIG. 2.

The image 201 shows a number tag 202, and characters of the number tag 202, "20" for example, are slanted.

Additionally, the image storage unit 10 is equipped with a storage table (see FIG. 5) in which information of each of contour points forming a contour of a character (such as coordinates and numbers showing order in the corresponding contour) are stored as an array.

The image extracting unit 11 extracts an image of a figure or characters from a recognition target (processing target) from the image 201 read from the image storage unit 10.

Figure 3:
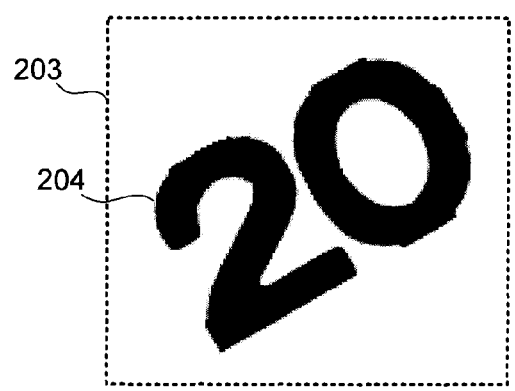
FIG. 3 is a diagram showing an example of a figure to be processed.

For example, in the example shown in FIG. 2, an image 204 of a character string part including characters "20" (hereinafter referred to as a "processing target figure 204") is extracted as shown in FIG. 3.

If the image shown in FIG. 2 is the image to be processed, the image extracting unit 11 reads the image 201 stored in the image storage unit 10 and extracts an image of a processing target from the slanted number tag 202. But if the processing target figure 204 shown in FIG. 3 is stored in the image storage unit 10, the image extracting unit 11 is unnecessary.

The tangent calculating unit 12 extracts a contour as a bent line represented as an set of contour points from an image extracted by the image extracting unit 11 from the image storage unit 10, and computes tangents to the extracted contour.

Figure 4:
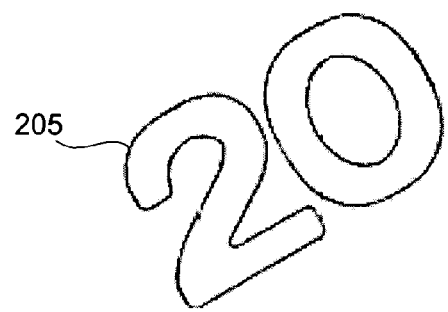
FIG. 4 is a diagram showing contours extracted from the processing target figure.

The contour tracing unit 13 traces the contour of the processing target figure 204 based on pixel colors, and generates a contour 205 (see FIG. 4).

More specifically, the contour tracing unit 13 enumerates contour points forming contours dividing the inside and the outside of the processing target figure 204, to compute the minimum bounding rectangles of the figure to be processed.

Each contour point is represented by coordinates of the contour point.

In the following description, the image to be processed (see FIG. 2) is assumed to be a binary image, and the processing target figure 204 (see FIG. 3) included therein, for which a minimum bounding rectangles are to be computed, is assumed to consist of connected components of black pixels.

The vector direction calculating unit 15 computes directions (vector direction) of tangents to the contour 205 (see FIG. 4) generated by the contour tracing unit 13.

Figure 6:
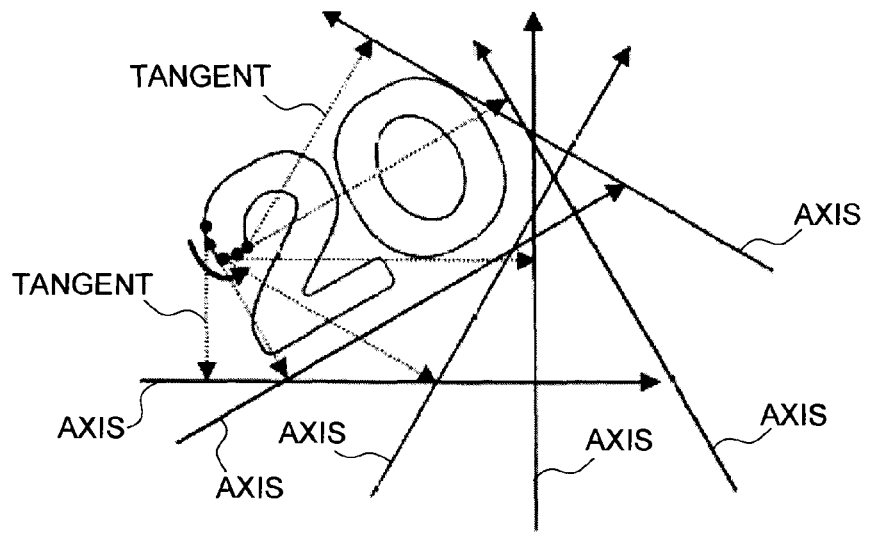
FIG. 6 is a diagram showing examples of tangents drawn from contour points.

The direction-specific contour point projecting unit 16 virtually sets an axis orthogonal (perpendicular) to the tangent drawn from each contour point on the contour 205 computed by the tangential direction calculating unit 14, projects the tangent to this axis (see FIG. 6), and computes coordinates of an intersection where the tangent intersects the axis.

Figure 7:
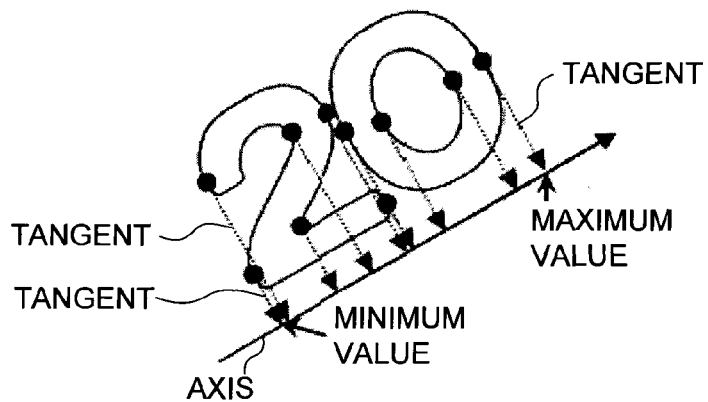
FIG. 7 is a diagram showing an example of selection of maximum values and minimum values of coordinates of intersections projected from contour points to an axis.

The direction-specific rectangle calculating unit 17 selects intersections with maximum values and minimum values of coordinates among intersections computed by the direction-specific contour point projecting unit 16 in each direction of the axis (see FIG. 7).

Figure 8:
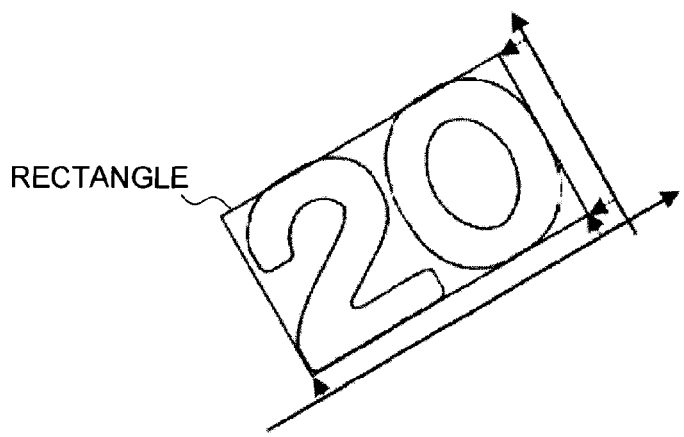
FIG. 8 is a diagram showing a minimum bounding rectangle of contours for a certain axis.

Then the direction-specific rectangle calculating unit 17 computes a rectangle formed by a pair of parallel tangents passing through two intersections with maximum values and the minimum values selected for a first axis and another pair of tangents passing through two intersections with maximum values and minimum values selected for a second axis orthogonal to the first axis (see FIG. 8).

In other words, the direction-specific rectangle calculating unit 17 selects intersections with maximum values and minimum values of coordinates among intersections computed by the direction-specific contour point projecting unit 16 in each direction, and computes a rectangle having coordinates of an upper and lower ends and a left and right ends, which are the maximum values and the minimum values selected in each direction, for each of combinations of orthogonal directions. Note that the rectangle is formed surrounding the contour.

The meaning of "surrounding the contour" includes being circumscribed on a contour, approximating to a contour, or being in contact with a contour.

The output unit 18 outputs a rectangle computed by the direction-specific rectangle calculating unit 17, and for example is a display unit such as a display.

Further, for the output unit 18, an image processing module or the like performing character recognition processing for example can be applied, other than the display unit.

The image processing module will be described in detail in the seventh embodiment and the eighth embodiment which will be described later.

The input unit 19 instructs start and end of image processing, and is materialized by a keyboard, a mouse, or the like for example.

Hereinafter, operation of the image processing apparatus of the first embodiment will be described with reference to FIG. 3 to FIG. 10.

The image extracting unit 11 extracts an image as a recognition target (processing target) from a region slightly larger than the figure 204 or at least surrounding the figure 204 in the image 201 read from the image storage unit 10.

For example, in the example shown in FIG. 2, an image 203 including a part 204 expressing a character string "20", is extracted as shown in FIG. 3.

FIG. 2 shows an example of a number tag with a circular border. If the number in this tag is to be recognized, and if the border is red, the image extracting unit 11 stores the image 201 as a color image represented by RGB in the image storage unit 10.

Then the image extracting unit 11 extracts pixels in the image 201, of which pixel values for R component is equal to or higher than twice of pixel values for G and B components, as black pixels in a binary image The image extracting unit 11 then detects a circular area by Hough transform from the extracted binary image, and creates an image in which the area outside the circular area is masked by being painted white, thereby extracting the processing target image 204.

In the tangent calculating unit 12, the contour tracing unit 13 extracts a contour 205 (see FIG. 4) and contour points (see FIG. 9) forming the contour 205 from the image 203 extracted by the image extracting unit 11.

The contour tracing unit 13 in the tangent calculating unit 12 enumerates contour points of the processing target figure 204 in order on the contour. Here, this enumeration process will be described.

In this example, it is assumed that the image for which minimum bounding rectangles are to be computed is the character image 204 expressing a number "20" or the like for example, and is formed of coupled components of black pixels.

Figure 5:
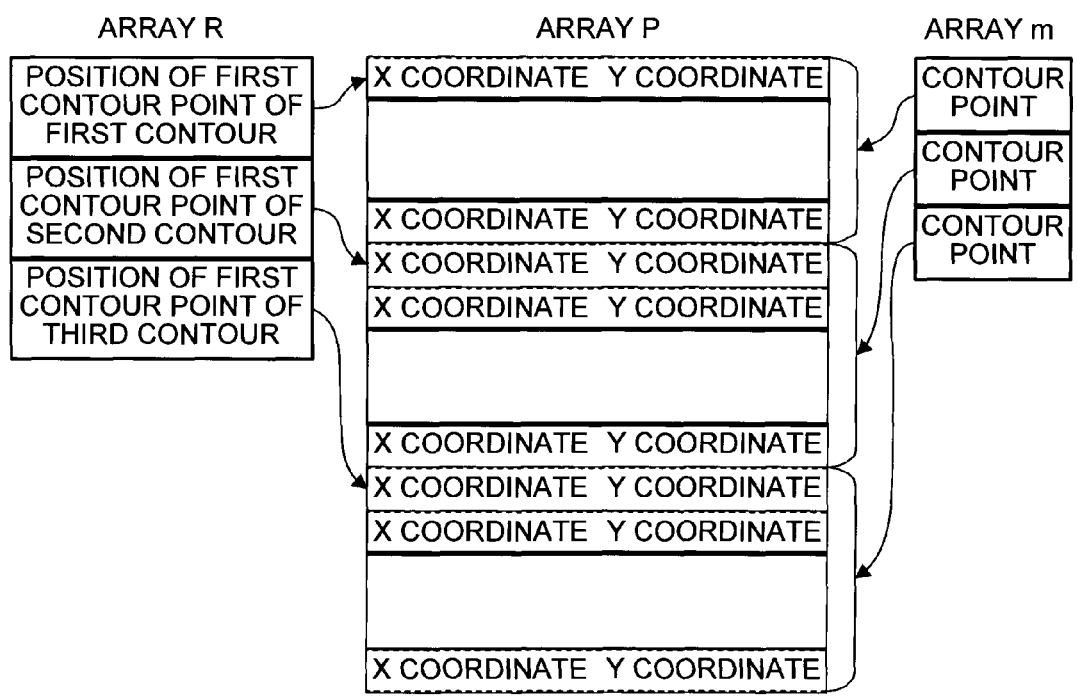
FIG. 5 is a diagram showing a table storing information of contour points.

Information of contour points is stored in the storage table shown in FIG. 5 for example. This storage table consists of array R, array P, and array m.

The array P indicates two-dimensional coordinates of contour points. The array R indicates position of the first contour point on each contour in the array P. The array m indicates number of contour points on each contour.

In the procedure described below, the image of the processing target is represented as, for example, a binary (0 or 1) array I w pixels wide and h pixels high, in which a binary value "0" represents a white pixel and a binary value "1" represents a black pixel.

The array F is also a binary array w pixels wide and h pixels high. Integer variables X0, Y0 represent coordinates of the point from which the next contour would be traced.

Integer variables X, Y represent coordinates of a currently traced contour point. X0 and X are positive in a rightward direction, and Y0 and Y are positive in a downward direction.

Integer variables D0, D1, D2 represent directions. For these variables the value 0 represents rightward, 1 represents upward, 2 represents leftward and 3 represents downward. An integer variable L represents the number of a currently traced contour.

An integer variable M represents the number of enumerated contour points. An array variable P is an array of two-dimensional coordinates, and stores coordinates of enumerated contour points.

An array variable R is an array of integers, and R[1] represents an element number indicating where the first contour point of an 1-th contour is located in the array P.

As an array variable m, m[1] represents the number of contour points enumerated for an 1-th contour.

The contour tracing unit 13 enumerates contour points by the following procedure.
1. L is initialized to 0.
2. M is initialized to 0.
3. All elements of the array F is initialized to 0.
4. Y0 is initialized to 0.
5. The following processing is repeated until Y0 reaches h.
   (A) X0 is initialized to 0.
   (B) The following procedure is repeated until X0 reaches w.
   [1] If the element at coordinates (X, Y) of the array F is 0, then the following processing is performed.
      (1) m[L] is set to 0.
      (2) R[L] is set to M.
      (3) X is set to X0, Y is set to Y0.
      (4) D0 is set to 2.
      (5) D1 is set D0.
      (6) The following processing is repeated.
         (a) P[M] is set to coordinates (X, Y). (A point at coordinates (X, Y) is enumerated as a contour point.)
         (b) m[L] is set to m[L]+1.
         (c) M is set to M+1.
         (e) The value of D2 is changed to the following values in the enumerated order until the value of a pixel adjacent to the pixel at coordinates (X, Y) in the direction expressed by D2 becomes 1. However, when the pixel in the direction of D2 is outside the image area, it is assumed that the value of the adjacent pixel is 0.
            (d1+3) MOD 4 (a MOD b expresses the remainder in division of a by b).
            D1
            (D1+1) MOD 4
            (D1+2) MOD 4
         (f) D1 is set to D2.
         (g) The element on coordinates (X, Y) in the array F is set to 1.
         (h) One of the following operations is performed according to the value of D1.
            If D1=0, then X is set to X+1.
            If D1=1, then Y is set to Y-1.
            If D1=2, then X is set to X-1.
            If D1=3, then X is set to Y+1.
         (i) If X=X0 and Y=Y0 and D1=D0, then the iteration of (6) is terminated.
      (7) L is set to L+1.
   [2] X0 is incremented by 1.
   (C) Y0 is incremented by 1.

Figure 9:
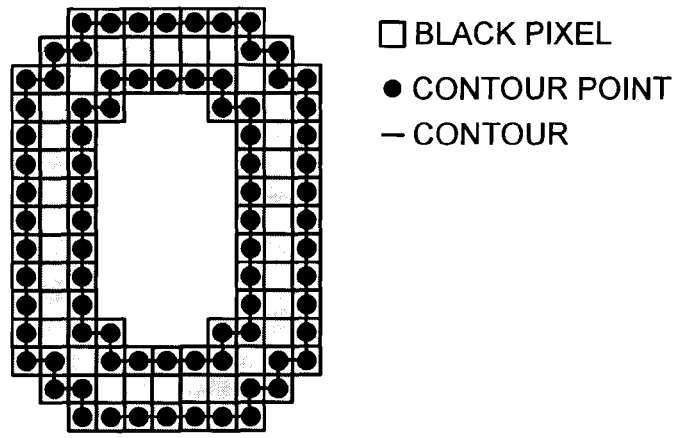
FIG. 9 is a diagram showing an example of enumerated contour points of a figure to be processed.

Thus, as shown in FIG. 9, contour points are enumerated for a processing target figure "0" for example.

Here, each "■" expresses a black pixel, each "•" expresses a contour point and each "-" connecting "•" points expresses a segment of a contour.

The tangential direction calculating unit 14 calculates the range of directions of tangents to a contour, for each of contour points enumerated by the contour tracing unit 13.

Here, 1 denotes the number of a contour to which a contour point, for which the range of directions of tangents is calculated, belongs, i denotes the number of a contour point on this contour, and d is a predefined natural number.

Figure 10:
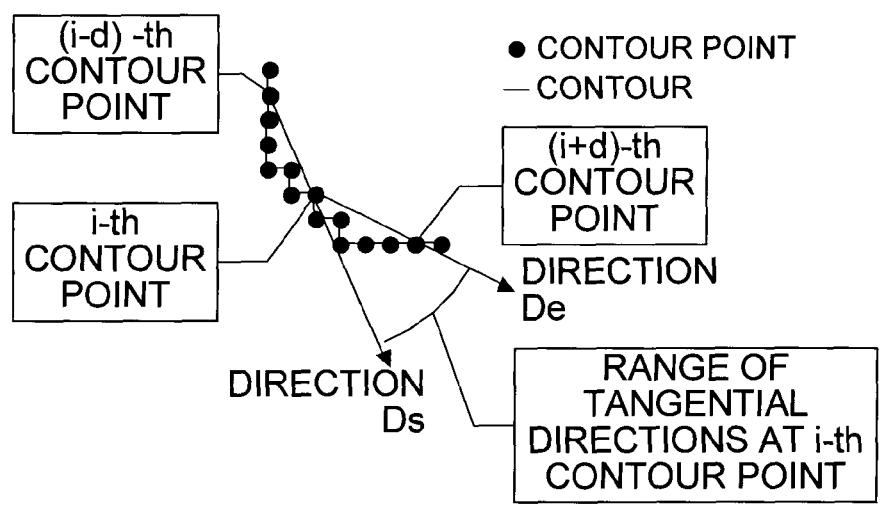
FIG. 10 is a diagram showing an overview of calculation of a range of tangential directions of contours.

In this example, the tangential direction calculating unit 14 calculates the range of tangential directions in the following procedure. An overview of this is shown in FIG. 10.

The tangential direction calculating unit 14 refers to the storage table of FIG. 5, first computes coordinates of an i-th contour point on the 1-th contour from the storage table, and (X, Y) are set to these coordinates. ((X, Y) are set to P[R[1]+i].)

The tangential direction calculating unit 14 obtains coordinates of the contour point d points before the i-th contour point on the 1-th contour and (Xs, Ys) is set to these coordinates. ((Xs, Ys) are set to P[R[1]+((i−d) MOD m[1])].)

The tangential direction calculating unit 14 obtains coordinates of the contour point d points after the i-th contour point on the 1-th contour and (Xe, Ye) is set to these coordinates. ((Xe, Ye) are set to P[R[1]+((i+d) MOD m[1])].)

The tangential direction calculating unit 14 calculates a difference vector Fs=(X−Xs, Y−Ys), and calculates a direction number Ds from the vector Fs by the vector direction calculating unit 15.

The tangential direction calculating unit 14 calculates a difference vector Fe=(Xe−X, Ye−Y), and calculates a direction number De from the vector Fe by the vector direction calculating unit 15.

The tangential direction calculating unit 14 sets ΔD=Ds−De.

Here, if ΔD≦N/2, then the tangential direction calculating unit 14 sets D1=Ds, D2=De.

On the other hand, if ΔD>N/2, then the tangential direction calculating unit 14 sets D1=De, D2=Ds.

D1 and D2 are thus computed by the calculating unit 14 as the range of the direction of tangent to the.

Subsequently, the vector direction calculating unit 15 calculates the direction (vector direction) of tangents to the contours 205 (see FIG. 4) generated by the contour tracing unit 13.

In this example, the vector direction calculating unit 15 calculates a direction number D from a vector F=(Fx, Fy).

The vector direction calculating unit 15 selects and use one of the following [expression 1], [expression 2], [expression 3], and [expression 4] depending on conditions and calculates the direction number of D.

If Fx=0,
  if Fy<0, then D=ROUND(N/4). . . [expression 1], or
  if Fy>0, then D=ROUND(3N/4). . . [expression 2].
If Fx>0,
  D=ROUND(ATAN(−Fy/Fx)×N/360) MOD N. . . [expression 3].
If Fx<0,
  D=(180+ROUND(ATAN(−Fy/Fx)×N/360)) MOD N. . . [expression 4]

However, the function ROUND(x) is a function which returns a value computed by rounding off a real number x.

The function ATAN(x) is an arctangent function of x.

The angle returned by the function ATAN(x) is in unit of "degrees".

The direction-specific contour point projecting unit 16 draws a tangent candidate D from a contour point to an axis orthogonal to the tangent candidate in each direction D in the range calculated by the tangential direction range calculating unit (vector direction calculating unit 15).

That is, the direction-specific contour point projecting unit 16 calculates a coordinate t on the intersection of the axis and the tangent candidate by projecting a contour point in direction D to the axis.

Note that the coordinate t is calculated using the following [expression 5].

t=X×COS(−360D/N−90)+X×SIN(−360D/N−90). . . [expression 5]

Here, the coordinates of the contour point are (X, Y).

The direction-specific rectangle calculating unit 17 computes a rectangle circumscribing the contour 205 (hereinafter referred to as a "minimum bounding rectangle") of the processing target figure 204 in each direction of the axis, according to intersections projected to the axis in the direction-specific contour point projecting unit 16. A minimum bounding rectangle is represented by coordinates of an upper and lower ends and a left and right ends.

The coordinates of a minimum bounding rectangle in a D-th direction are represented by a coordinate system with an axis (hereinafter referred to as a "U axis") in the direction D, and another axis (hereinafter referred to as a "V axis") in the direction at 90 degrees clockwise from the direction D.

Hereinafter, the coordinate along the U axis is referred as the U coordinate, and the coordinate along the V axis is referred as the V coordinate.

The minimum bounding rectangle in each direction is calculated in the following procedure by the direction-specific rectangle calculating unit 17.

1. For each tangential direction D, the maximum value of the coordinate t in a direction in which a contour point is projected by the direction-specific contour point projecting unit 16 is calculated and stored in the array A of the storage table.

A[D] is set to the maximum value of the coordinate t calculated in the direction-specific contour point projecting unit 16 in the direction D.

Note that the maximum value is calculated by the following procedure.

(1) A[D] is set to 0 where D=0, . . . , N−1.
(2) For each of contour points, the direction D computed in the vector tangential direction calculating unit and the coordinate t calculated in the direction-specific contour point projecting unit are obtained, and if t>A[D], then A[D] is set to t.

2. The V coordinate Ve(1, D) of the lower end of a minimum bounding rectangle in an angle D of an 1-th contour is set to A[D], the U coordinate Ue(1, D) of the right end is set to A[D+ROUND(N/4)], the V coordinate Vs(1, D) of the upper end is set to A[D+ROUND(N/2)], and the U coordinate Us(1, D) of the left end is set to A[D+ROUND(3N/4)].

The minimum bounding rectangle is thus calculated in each direction, and is outputted by the output unit 18. For example, the minimum bounding rectangle is displayed by a display.

In this manner, with the image processing apparatus of the first embodiment, by limiting the directions of tangents drawn from the contour 205 of the processing target figure 204 to certain ranges of angles (range of directions which a tangent can take) on the computation of minimum bounding rectangle of the processing target figure 204, and the increase of the computational complexity due to increase of number of directions are suppressed.

(Second Embodiment)

Next, an image processing apparatus of the second embodiment will be described with reference to FIG. 11 to FIG. 14.

Note that the same components as those in the above-described first embodiment will be given the same reference numerals, and duplicated descriptions are omitted.

Figure 11:
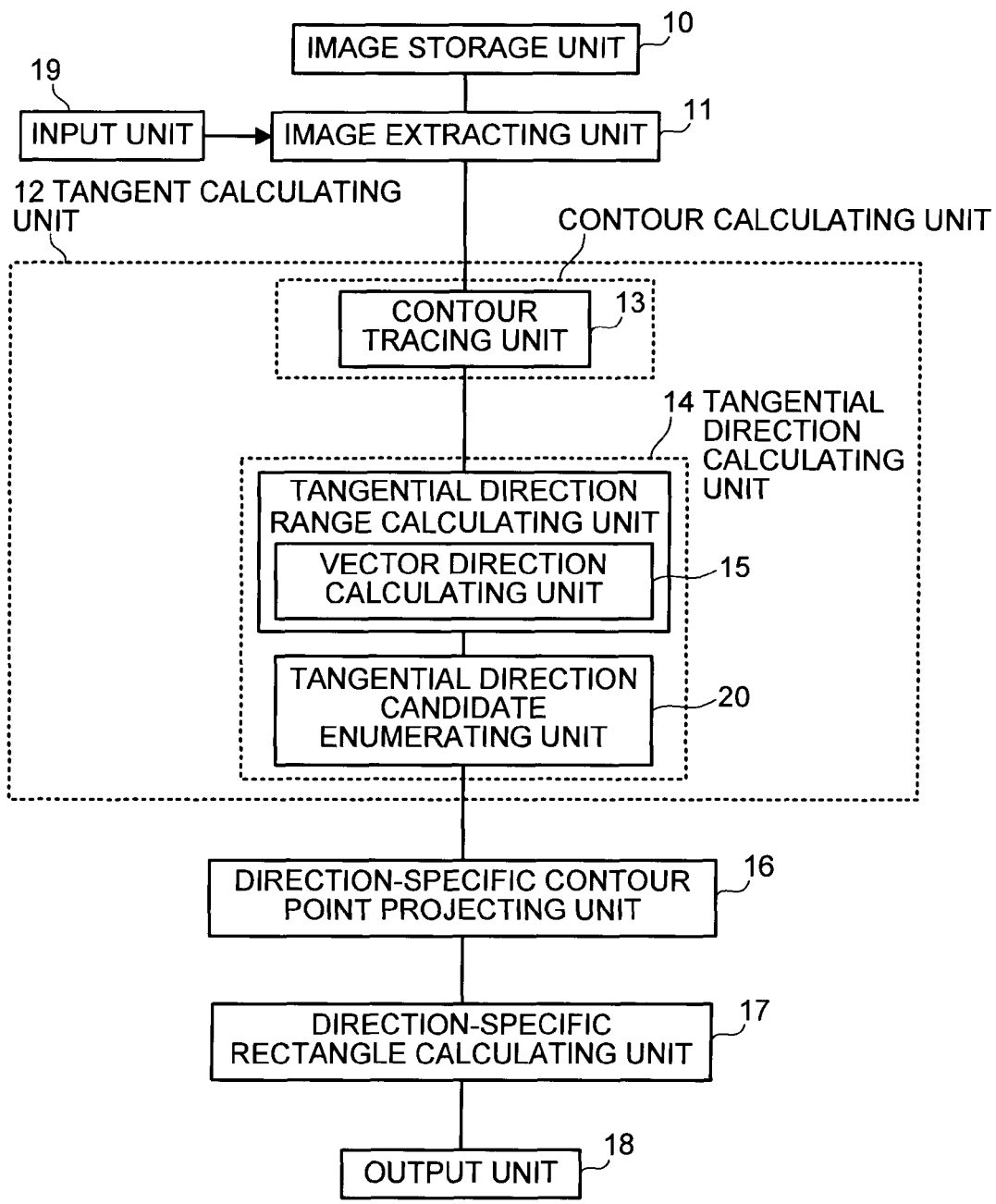
FIG. 11 is a diagram showing the structure of an image processing apparatus of the second embodiment.

In this image processing apparatus of the second embodiment, as shown in FIG. 11, the tangential direction calculating unit 14 has a tangential direction candidate enumerating unit 20.

The candidate enumerating unit 20 limits the tangential directions to N discrete directions, and enumerates (elects) tangent candidates existing in the range of directions (angles) computed by the vector direction calculating unit 15 for each of contour points on the contour.

Figure 12:
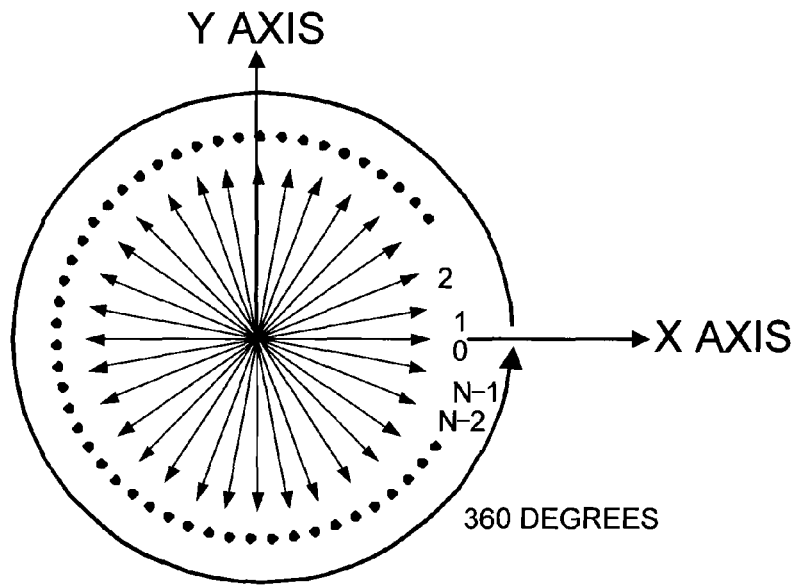
FIG. 12 is a diagram showing directions which a tangent would take when tangent candidates are enumerated from a contour.

That is, the directions in the computed range are chosen by the tangential direction candidate enumerating unit 20 as directions of tangent candidates from N directions dividing 360 degree evenly (see FIG. 12).

Candidates of direction to be enumerated is represented by a non-negative integer smaller than the predetermined number N.

A non-negative integer n represents a direction rotated 360n/N degrees from the X axis, as shown in FIG. 12. Thus the direction of the X axis is 0 degree.

The tangential direction candidate enumerating unit 20 enumerates tangent candidates of which the direction is in the range expressed as a pair of non-negative integers D1 and D2 computed by the vector direction calculating unit 15 at each contour point.

Here, the non-negative integer D1 is the start of the range of directions of tangents, and the non-negative integer D2 is the end of the range of directions of tangents.

Figure 13:
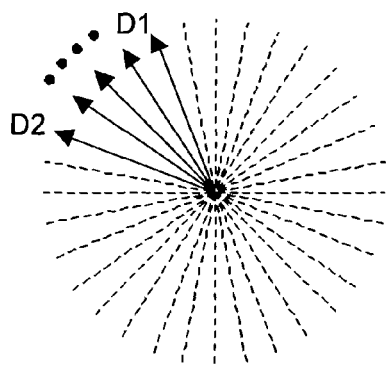
FIG. 13 is a diagram showing an example in which tangent candidates are enumerated when $D1 \leq D2$.

For example, when D1≦D2, the tangential direction candidate enumerating unit 20 enumerates all the non-negative integers from the non-negative integer D1 (start point) to the non-negative integer D2 (end point) as candidates of direction D of the tangent, as shown in FIG. 13.

Figure 14:
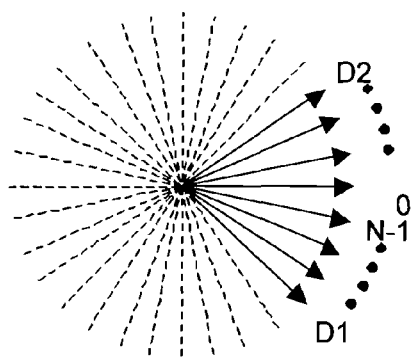
FIG. 14 is a diagram showing an example in which tangent candidates are enumerated when $D1 > D2$.

On the other hand, when D1>D2, the tangential direction candidate enumerating unit 20 enumerates the non-negative integers from the non-negative integers D1 (start point) to N−1 and 0 to D2 as candidates of direction D of tangent, as shown in FIG. 14.

In this manner, the tangential direction candidate enumerating unit 20 enumerates candidates of direction D of tangent on each contour point, while limiting the range of directions.

The direction-specific contour point projecting unit 16 draws a tangent candidate in each direction D in a range computed by the tangential direction candidate enumerating unit 20 for each contour point to an axis orthogonal to the direction D.

That is, the direction-specific contour point projecting unit 16 calculates the coordinate t on an axis orthogonal to the direction D by projecting contour points to the axis.

Note that the coordinate t is calculated using [expression 5] shown in the first embodiment.

Thus, with the image processing apparatus of the second embodiment, the directions of tangents for which computation is performed are limited in the range calculated by the tangential direction range calculating unit. Thus, increase of computational complexity due to increase of the number of directions are suppressed.

(Third Embodiment)

Next, an image processing apparatus of the third embodiment will be described with reference to FIG. 15 and FIG. 16.

Note that the same components as those in the above-described first embodiment will be given the same reference numerals, and duplicated descriptions are omitted.

Figure 15:
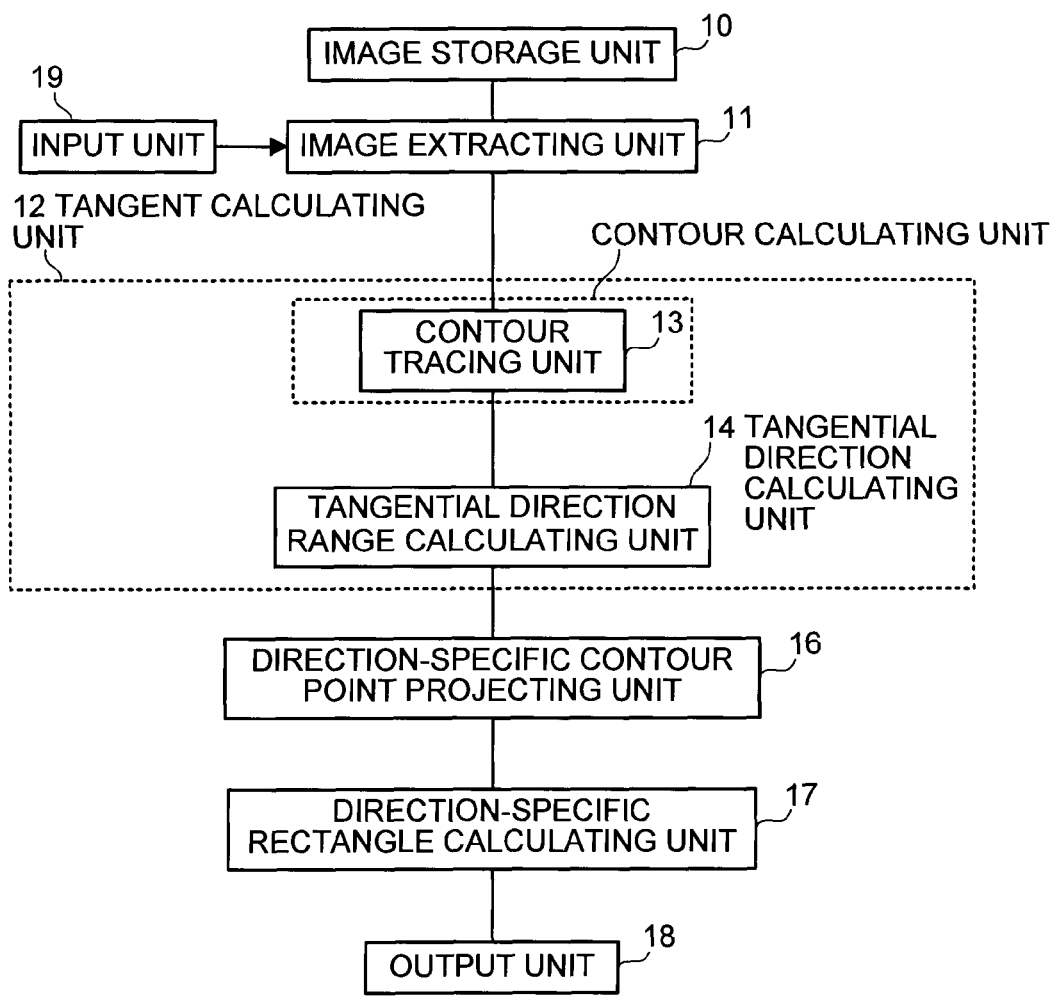
FIG. 15 is a diagram showing the structure of an image processing apparatus of the third embodiment.

This image processing apparatus of the third embodiment is simplified to have a structure for just calculating, as shown in FIG. 15, directions of tangents to be drawn from contour points without enumerating a range of directions of tangents and candidates of tangents as performed in the tangential direction calculating unit 14 shown in the above-described first and second embodiments.

Figure 16:
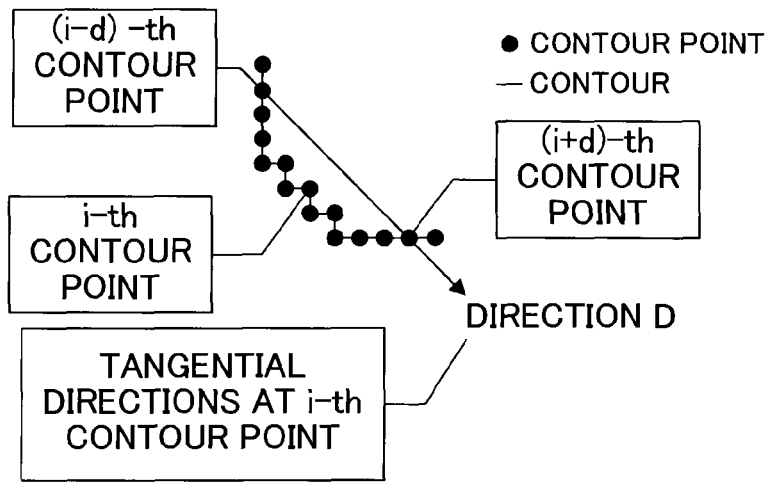
FIG. 16 is a diagram showing an overview of computing a tangent from a contour point on a contour in the third embodiment.

In this structure, the tangential direction calculating unit 14 calculates a tangent for each of contour points of the processing target figure, as shown in FIG. 16.

Contour points are determined by the contour tracing unit 13, and thus the tangential direction calculating unit 14 calculates directions of tangents by the following procedure.

1. Coordinates of the contour point d points before the i-th contour point on the 1-th contour are obtained and (Xp, Yp) are set to these coordinate.

((Xp, Yp) are set to P[R[1]+((i−d) MOD m[1])].)

2. Coordinates of the contour point d points after the i-th contour point on the 1-th contour are computed and (Xn, Yn) are set to these coordinates.

((Xn, Yn) are set to P[R[1]+((i+d) MOD m[1])].)

3. A difference vector F=(Xn−Xp, Yn−Yp) is calculated.

In this structure, the direction-specific contour point projecting unit 16 draws the tangent in direction D calculated by the tangential direction calculating unit 14 for each contour point to an axis orthogonal to the direction D.

That is, the direction-specific contour point projecting unit 16 calculates a coordinate t on the axis orthogonal to the tangent direction D by projecting a contour point to the axis.

In this manner, with the image processing apparatus of the third embodiment, operation (calculation) of directions of tangents can be performed in a simple manner, and computation of minimum bounding rectangles are performed at higher speed.

(Fourth Embodiment)

Next, an image processing apparatus of the fourth embodiment will be described.

Note that this embodiment is the same as the first embodiment in arrangement of components (see FIG. 1) and is different therefrom in function (operation) of a part of the components (tangential direction range calculating unit).

In the first embodiment, a range of directions of tangents is calculated for each of points on the contour 205 of the processing target figure 204, and a tangent is projected (drawn) from each of the contour points therein.

On the other hand, in the image processing apparatus of the fourth embodiment, the contour 205 is divided into small sections in predetermined length, a range of tangent directions is calculated for each of the divided small sections, and a tangent is projected (drawn) from each of the small sections for each of direction in the range corresponding to the section therein to an axis.

As an example, small sections are defined as a pair of adjacent contour points among contour points computed by the contour tracing unit 13.

The direction-specific contour point projecting unit 16 projects each small section to an axis orthogonal to a direction in the range calculated by the tangential direction range calculating unit.

When the condition D1≦D2 is met for the start D1 and the end D2 for the range of directions calculated by the tangential direction range calculating unit, a coordinate t of the projection is calculated for each of integers D satisfying D1≦D≦D2 by the aforementioned [expression 5] for each of contour points on both ends of a small section, and is used for updating the array A[D] in the direction-specific rectangle calculating unit 17.

However, in calculation of the coordinate t with the aforementioned [expression 5], coordinates (X, Y) of contour points of both ends of the small section are used to calculate t and to update the array A[D].

Further, if D1>D2, each of the non-negative integers from the start point D1 to N−1 and 0 to the end point D2 is taken as D, and the coordinate t of a projection is calculated with the aforementioned [expression 5] for each of contour points of both ends between small sections, and is used for updating the array A[D] in the direction-specific rectangle calculating unit 17.

However, in calculation of the coordinate t with the aforementioned [expression 5], coordinates (X, Y) of contour points of both ends of the small section are used to calculate t and to update the array A[D].

Thus, with the image processing apparatus of the fourth embodiment, the directions of tangents of a calculation target is limited in the range of directions of tangents calculated by the tangential direction range calculating unit. Thus, increase of computational complexity due to the increase of number of directions can be suppressed.

Further, by dividing a contour of the processing target figure not by each black pixel but into small sections with a certain length, the number of candidates of tangents for which computation is done is reduced, thus the computational complexity is reduced.

(Fifth Embodiment)

Next, an image processing apparatus of the fifth embodiment will be described.

Note that this embodiment is the same as the above-described second embodiment in arrangement of components (see FIG. 11) and different in function (operation) of a part of components (tangential direction candidate enumerating unit 20).

In the second embodiment, the range of directions for which tangents are drawn is limited for each point on the contour 205 of the processing target figure 204, and tangents in directions existing in this range are enumerated as candidates.

On the other hand, in the image processing apparatus of this fifth embodiment, the tangential direction candidate enumerating unit 20 divides the contour generated in the contour tracing unit into predetermined lengths, computes the range of directions of tangents for each of divided small sections, and enumerates tangents existing in the range as candidates.

Calculation of the range of directions of tangents in the tangential direction range calculating unit is performed by the following procedure.

1. A direction Ds of a tangent at the contour point d points before the start point of the small section is calculated.

The direction Ds of the tangent is computed in the same manner as in the tangential direction calculating unit 14 in the third embodiment.

2. A direction De of a tangent at the contour point d points after the end point of the small section is calculated.

The direction De of a tangent is computed in the same manner as in the tangential direction computing unit in the third embodiment.

3. ΔD=Ds−De is set.

4. If ΔD≦N/2, then D1=Ds and D2=De. If ΔD>N/2, then D1=De and D2=Ds.

5. A range from D1 to D2 is taken as a range of directions of tangents.

Here, d is a predefined natural number.

The tangential direction candidate enumerating unit 20 divides a contour generated in the contour tracing unit 13 into predetermined lengths, computes a range of directions of tangents for each of the divided small sections, and enumerates tangents existing in the range as candidates.

Thereafter, the direction-specific contour point projecting unit 16 calculates coordinates of intersections by projecting of contour points at both ends of the small section to an axis orthogonal to the candidates of directions of tangents enumerated in the tangential direction candidate enumerating unit 20.

At this time, projections of contour points are calculated using the above-described [expression 5] as a coordinate t of a projection to this axis.

Here, the coordinates of the contour point are (X, Y).

In this manner, with the image processing apparatus of the fifth embodiment, the tangential direction candidate enumerating unit 20 enumerates candidates of tangents from a range of directions of contours for each of small sections, which are obtained by dividing a contour. Thus, the number of candidates of tangents for which computation is done is reduced, thus the increase of computational complexity due to increase of number of directions is suppressed.

(Sixth Embodiment)

Figure 17:
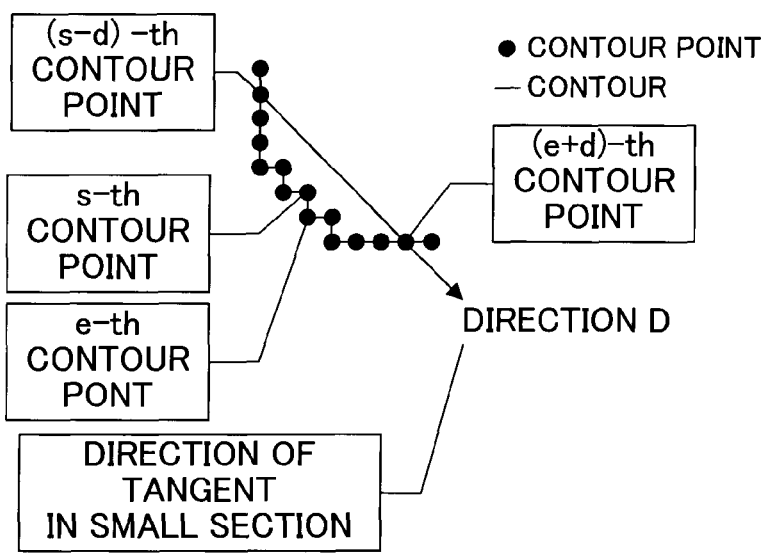
FIG. 17 is a diagram showing an overview of computing a tangent from a small section on a contour in the sixth embodiment.

Next, an image processing apparatus of the sixth embodiment will be described with reference to FIG. 17.

Note that this embodiment is the same as the above-described third embodiment in arrangement of components (see FIG. 15) and is different in function (operation) of part of components (tangential direction calculating unit 14).

In the image processing apparatus of the sixth embodiment, the tangential direction calculating unit 14 divides a contour of the processing target figure into predetermined lengths, and calculates a direction of the contour for each of the divided small sections.

Further, the direction-specific rectangle calculating unit 17 surrounds the contour of the processing target figure with tangents based on intersections projected by the direction-specific contour point projecting unit 16 from the respective small sections of the contour to axes, and computes a rectangle circumscribed with the processing target figure for each of the directions.

In this sixth embodiment, the number of the contour point located at the start point of the small sections on this contour is denoted by "s", and the number of the contour point located at the end point thereof on this contour is denoted by "e". The number of this contour is 1. In this embodiment, the tangential direction calculating unit 14 calculates the direction of a tangent in the following procedure. An overview of calculation of the direction of a tangent in the tangential direction calculating unit 14 is shown in FIG. 17.

Coordinates of the contour point d points before the start point of small sections on an 1-th contour are obtained and (Xp, Yp) are set to these coordinates.

((Xp, Yp) are set to P[R[1]+((s−d) MOD m[1])].)

2. Coordinates of the contour point d points after the end point of the small sections on the 1-th contour are obtained and (Xn, Yn) are set to these coordinate.

((Xn, Yn) are set to P[R[1]+((e+d) MOD m[1])].)

3. A difference vector F=(Xn−Xp, Yn−Yp) is calculated. The direction number D is calculated from the calculated vector F.

Here, d is a predefined natural number.

In this manner, with the image processing apparatus of the sixth embodiment, operation (calculation) of directions of tangents can be performed in a simple manner, and computation of minimum bounding rectangles can be performed at higher speed.

Further, by dividing the contour into small sections and drawing tangents from these sections instead of contour points, the number of candidates of tangents for which computation is done is reduced, thus the computational complexity is reduced.

That is, in the above-described fourth to sixth embodiments, the tangential direction calculating unit 14 divides a contour of the processing target figure into small sections, and performs processing such as calculation of the direction of a tangent (third embodiment), calculation of the range of directions of tangents (first embodiment), enumeration of candidates of tangents existing in the range of directions of tangents (second embodiment), and so on, for each of the divided small sections.

(Seventh Embodiment)

Next, with reference to FIG. 18, an image processing apparatus of the seventh embodiment will be described.

Note that the same components as those in the above-described first embodiment will be given the same reference numerals, and duplicated descriptions are omitted.

The image processing apparatus of the seventh embodiment illustrates how minimum bounding rectangles are processed after the minimum bounding rectangle is computed in each direction of a contour by the structure described in anyone of the first to sixth embodiments (structure up to the direction-specific rectangle calculating unit 17).

Figure 18:
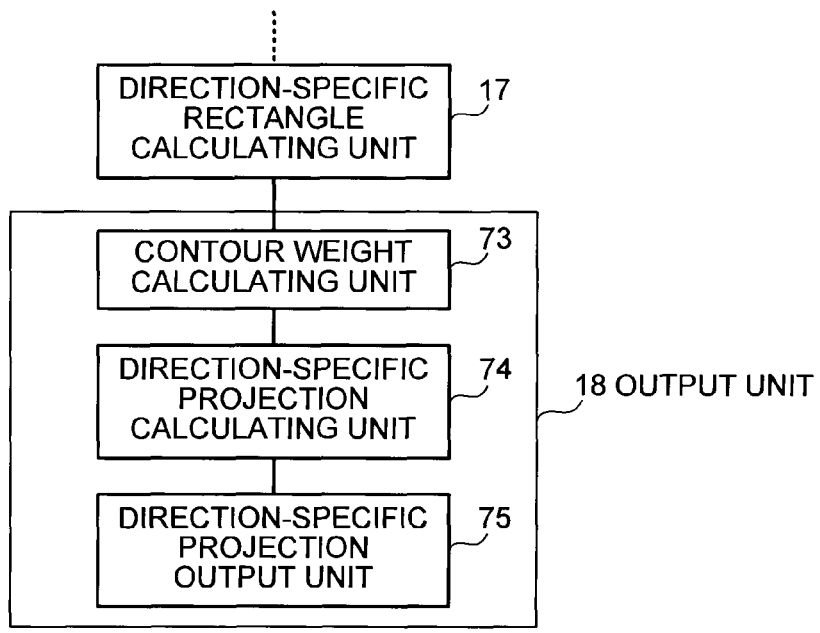
FIG. 18 is a diagram showing the structure of an image processing apparatus of the seventh embodiment.

The image processing apparatus of the seventh embodiment has, in addition to the structure described in any one of the first to sixth embodiments (structure up to the direction-specific rectangle calculating unit 17), a contour weight calculating unit 73, a direction-specific projection calculating unit 74, and a direction-specific projection output unit 75 as the output unit 18, as shown in FIG. 18.

The contour weight calculating unit 73 calculates a weight for each contour.

The direction-specific projection calculating unit 74 calculates the projection of the processing target figure in each direction, from the weights of contours calculated in the contour weight calculating unit 73 and minimum bounding rectangles corresponding to the contours calculated (estimated) for multiple directions by the direction-specific rectangle calculating unit 17.

The direction-specific rectangle calculating unit 17 has the same structure as that described in any one of the first to sixth embodiments, and computes a minimum bounding rectangle of a contour in each direction from the contour generated from the processing target figure.

The contour weight calculating unit 73 calculates a weight for each contour of the processing target figure.

The area surrounded by this contour is calculated as the weight of an 1-th contour.

The reason to calculate the area surrounded by the contour as the weight is because the resulting projection approximates the projection of black pixels surrounded by the contour.

For the area surrounded by the 1-th contour, the area ΔS[i] is calculated by the following [expression 6] for each contour point on this contour, and then the surrounded area is calculated as a sum total S[1] of the area ΔS[i] for each contour.

ΔS[i]=(P[R[1]+i].X+P[R[1]+j].X)×(P[R[1]+i].Y−P[R[1]+j].Y)/2 [expression 6]

Here, i is the number of this contour point on this contour. P[k] represents a k-th element of an array storing coordinates of contour points enumerated in the contour tracing unit 13.

P[k].X represents an X component of P[k]. P[k].Y represents a Y component of P[k].

Here, j=(i+1) MOD N.

The direction-specific projection calculating unit 74 calculates a projection of the processing target figure in each direction from the weights of a contours calculated by the contour weight calculating unit 73 and the minimum bounding rectangles of corresponding contours calculated for each direction by the direction-specific rectangle calculating unit 17.

The number of the contour is 1, the direction thereof is D, and the coordinate on the axis in this direction is t.

At this time, the direction-specific projection calculating unit 74 calculates the increment ΔJ(1, D, t) of the projection using the following [expression 7]. For example, the increment ΔJ(1, D, t) of the projection is calculated for each coordinate t between the coordinates ROUND(Vs(1, D)) and ROUND(Ve(1, D)), and the calculated increment (1, D, t) of the projection is added to the projection J[t], thereby calculating the projection for the direction D.

$$\Delta J(1, D, t) = S[1]/(Ve(1, D) - Vs(1, D)) \quad [\text{expression 7}]$$

Here, Us(1, D) is the U coordinate of the left end of the minimum bounding rectangle at the angle D of the 1-th contour obtained in the direction-specific rectangle calculating unit 17, Vs(1, D) is the V coordinate of the upper end of the minimum bounding rectangle, Ue(1, D) is the U coordinate of the right end of the minimum bounding rectangle, and Ve(1, D) is the V coordinate of the lower end of the minimum bounding rectangle.

With this image processing apparatus of the seventh embodiment, a projection useful for extraction of a character row or a character in character recognition processing is calculated at high speed.

(Eighth Embodiment)

Next, an image processing apparatus of the eighth embodiment will be described with reference to FIG. 19 and FIG. 20.

Note that the same components as those in the above-described seventh embodiment will be given the same reference numerals, and duplicated descriptions are omitted.

The image processing apparatus of the eighth embodiment illustrates how the projection is processed after the projection of the processing target figure is computed in each direction by the direction-specific projection calculating unit 74 described in the seventh embodiment.

Figure 19:
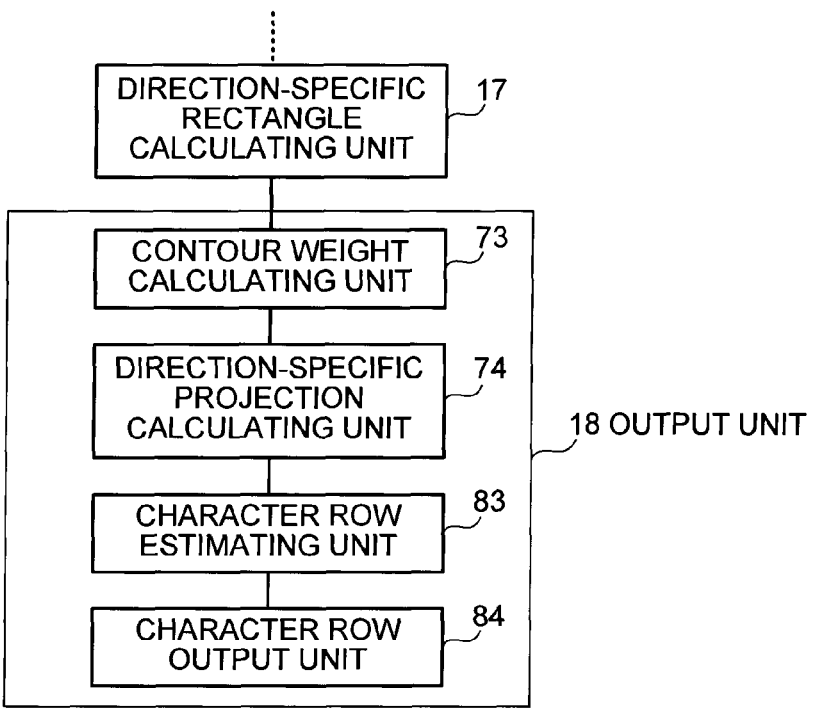
FIG. 19 is a diagram showing the structure of an image processing apparatus of the eighth embodiment.

The image processing apparatus of the eighth embodiment has, in addition to the structure described in any one of the first to sixth embodiments (structure up to the direction-specific rectangle calculating unit 17), a contour weight calculating unit 73, a direction-specific projection calculating unit 74, a character row estimating unit 83, and a character row output unit 84 as the output unit 18, as shown in FIG. 19.

The character row estimating unit 83 estimates the direction of the character row in the processing target figure based on the projections in multiple directions of the processing target figure calculated in the direction-specific projection calculating unit 74.

The character row output unit 84 outputs a character row estimated by the character row estimating unit 83. When the character row output unit 84 is a display or the like for example, the unit performs output such as displaying the character row on a screen thereof.

The direction-specific projection calculating unit 74 has a structure shown in the seventh embodiment, and calculates projections of the processing target figure.

Figure 20:
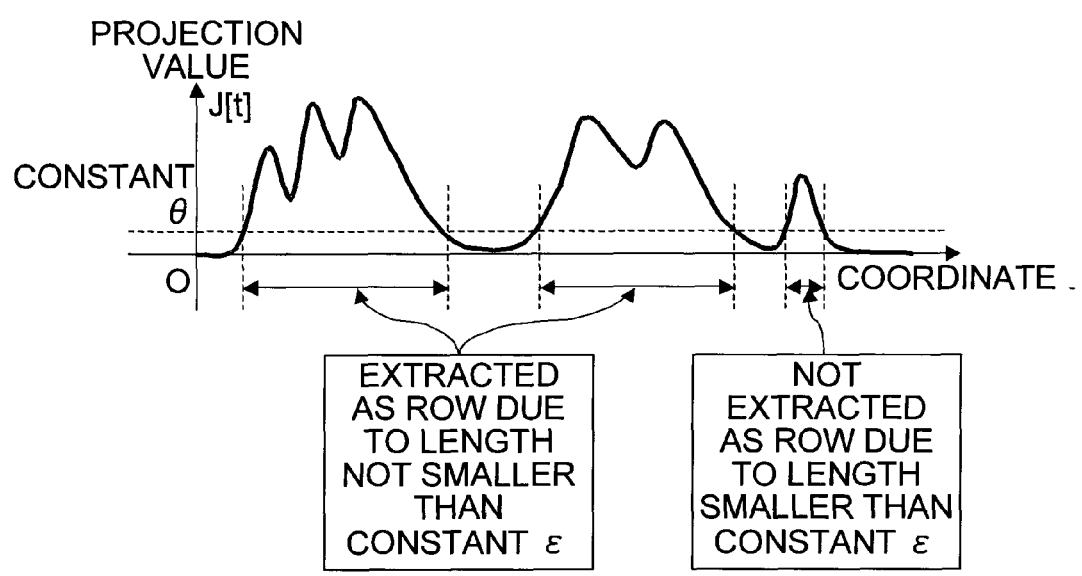
FIG. 20 is a diagram showing an overview of extracting a character row.

The character row estimating unit 83 extracts an area with a length that is not smaller than a predefined constant ε as a "row", from sections in which projections calculated by the direction-specific projection calculating unit 74 exceed a predefined constant θ, as shown in FIG. 20.

In this manner, with the image processing apparatus of the eighth embodiment, the direction of a character row in the processing target figure is estimated based on the projection of the processing target figure in each direction. Thus, character recognition processing of an image read from a picture in which the direction of the character string is not constant, such as a number tag, a name tag, or the like attached to a piece of clothing by hand for example, can be performed at high speed by aligning the direction of characters in a dictionary for character recognition in the direction of the processing target figure.

According to the above-described embodiments, when calculating a projection, the computational complexity is reduced by limiting the direction of calculating the projection to the direction orthogonal to the contour.

Therefore, it is possible to calculate the projection for more directions if the computational resource is limited.

Specifically, if the direction of a character row is estimated using the projections of the processing target figure, and if the computational resource is limited, it is possible to estimate the row direction in higher accuracy.

Note that the invention of the present application is not limited to the above-described embodiments, and the components can be modified in the range not departing from the spirit of the invention in implementation stages.

Further, a plurality of the components disclosed in the embodiments can be combined appropriately to form various kinds of inventions.

For example, the structures shown in the above-described embodiments can be materialized not only in hardware but also by incorporating it as, for example, modules (program) of image processing software in a computer.

Further, the program may be stored in a computer readable electronic medium, and the function of the present invention may be materialized with a computer by reading the program from the electronic medium to the computer. Examples of the electronic medium include a storage medium such as a CD-ROM, a flash memory, a removable medium, and so on.

Further, the structure shown in the above-described embodiment may be mounted in dedicated hardware or a set of dedicated hardware, or in a distributed manner on one computer in a computer network for distributed processing. As long as all the required elements necessary to materialize the present invention among the above-described components are included, the invention may be materialized in any form, regardless of the structure exemplified in the embodiments.

Furthermore, several components may be deleted from all the components shown in the embodiments.

Moreover, the components ranging across different embodiments may be combined appropriately to form the invention.

What is claimed is:

1. An image processing apparatus, comprising:
   a storage unit storing an image of a processing target;
   a tangent calculating unit extracting contours represented as sets of contour points from an image read from the storage unit and computing tangents with respect to the extracted contours;
   a projecting unit projecting tangents computed by the tangent calculating unit to axes in the direction orthogonal to the corresponding tangent, and computing coordinates of intersections where the tangents and the corresponding axes intersect; and
   a rectangle calculating unit selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

2. The image processing apparatus according to claim 1, wherein the tangent calculating unit computes a tangent in each of sections which are computed by dividing the contour into predetermined lengths.

3. The image processing apparatus according to claim 1, wherein the tangent calculating unit computes a tangent for each of contour points on the contours.

4. The image processing apparatus according to claim 1, wherein the tangent calculating unit comprises:
   a contour tracing unit tracing contour points on the contour sequentially starting from a certain position on the contour;
   a tangent range determining unit determining a direction in which the tangent is to be drawn, according to the tracing result of each contour point traced by the contour tracing unit; and
   an in-range tangent calculating unit computing the tangent from the contour in the range of angles determined by the tangent range determining unit.

5. The image processing apparatus according to claim 4, wherein the in-range tangent calculating unit comprises a tangent candidate enumerating unit chooses the direction of the tangent candidates from N directions dividing 360 degree evenly.

6. The image processing apparatus according to claim 1, further comprising:
   a weight calculating unit calculating a weight for each of the contours; and
   a projection calculating unit calculating a projection of the image in each direction from a weights of contours calculated by the weight calculating unit and minimum bounding rectangles corresponding to the contours calculated for multiple directions by the rectangle calculating unit.

7. The image processing apparatus according to claim 6, further comprising,
   a character row estimating unit estimating the direction of a character row based on projections in multiple directions calculated by the projection calculating unit.

8. A non-transitory electronic medium configured to store an image processing program to execute image processes in an image processing apparatus, the image processing program providing functions of the image processing apparatus, the functions including: reading an image from a storage unit, extracting contours represented as sets of contour points from the read image, and computing tangents to the extracted contours; projecting computed tangents to an axes orthogonal to the tangents, and computing coordinates of an intersections where the tangents intersect the axis; and
   selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

9. An image processing method in an image processing apparatus having a storage unit storing an image of a processing target, the image processing method comprising:
   extracting a contour represented as sets of contour points from an image read from the storage unit and computing a tangents with respect to the extracted contours;
   projecting a computed tangents to an axes orthogonal to the tangents, and computing coordinates of an intersections where the tangents intersect the axis; and
   selecting intersections with maximum values and minimum values of coordinates among intersections computed by the projecting unit for each direction of the axis, and computing a rectangle formed by a pair of parallel tangents passing through two intersections with maximum values and minimum values selected for a first axis and another pair of tangents passing through two intersections with maximum values and minimum values selected for a second axis orthogonal to the first axis.

10. The image processing method according to claim 9, further comprising,
    computing a tangent in each of sections which are obtained by dividing the contour into predetermined lengths.

11. The image processing method according to claim 9, further comprising,
    computing a tangent for each of contour points on the contours.

12. The image processing method according to claim 9, further comprising:
    tracing contour points on the contour sequentially from a certain position on the contour;
    determining a direction in which the tangent is to be drawn, according to the tracing result of each traced contour point; and
    computing the tangent from the contour in the determined range of angles.

13. The image processing method according to claim 12, further comprising,
    choosing the direction of the tangent candidates from N directions dividing the 360 degree evenly.

14. The image processing method according to claim 9, further comprising:
    calculating a weight for each of the contours; and
    calculating a projection of the image in each direction from a calculated weights of contours and minimum bounding rectangles corresponding to the contours calculated for multiple directions.

15. The image processing method according to claim 14, further comprising,
    estimating the direction of a character row based on calculated projections in multiple directions.

* * * * *

UNITED STATES PATENT AND TRADEMARK OFFICE
CERTIFICATE OF CORRECTION

PATENT NO. : 8,340,433 B2  Page 1 of 1
APPLICATION NO. : 12/549827
DATED : December 25, 2012
INVENTOR(S) : Suzuki It is certified that error appears in the above-identified patent and that said Letters Patent is hereby corrected as shown below:

Title page, item (57), in the Abstract, line 1, change "include" to --includes--.

Title page, item (57), in the Abstract, line 3, change "a bent lines" to --bent lines--.

Signed and Sealed this
Nineteenth Day of March, 2013

Teresa Stanek Rea
*Acting Director of the United States Patent and Trademark Office*